Dec. 4, 1934. C. G. A. ROSEN 1,982,759
GASKET
Filed June 11, 1932 2 Sheets-Sheet 2
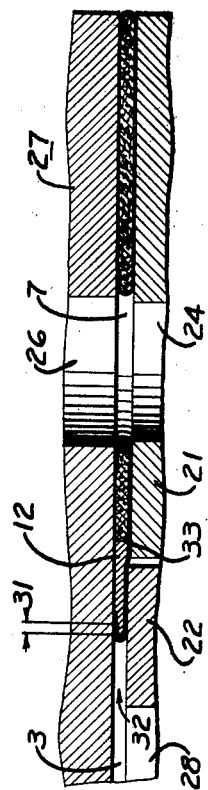
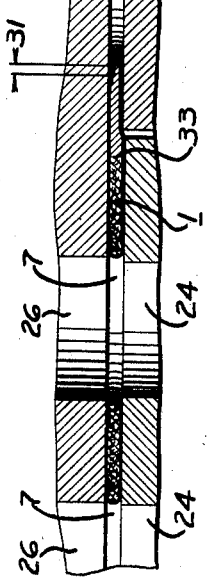
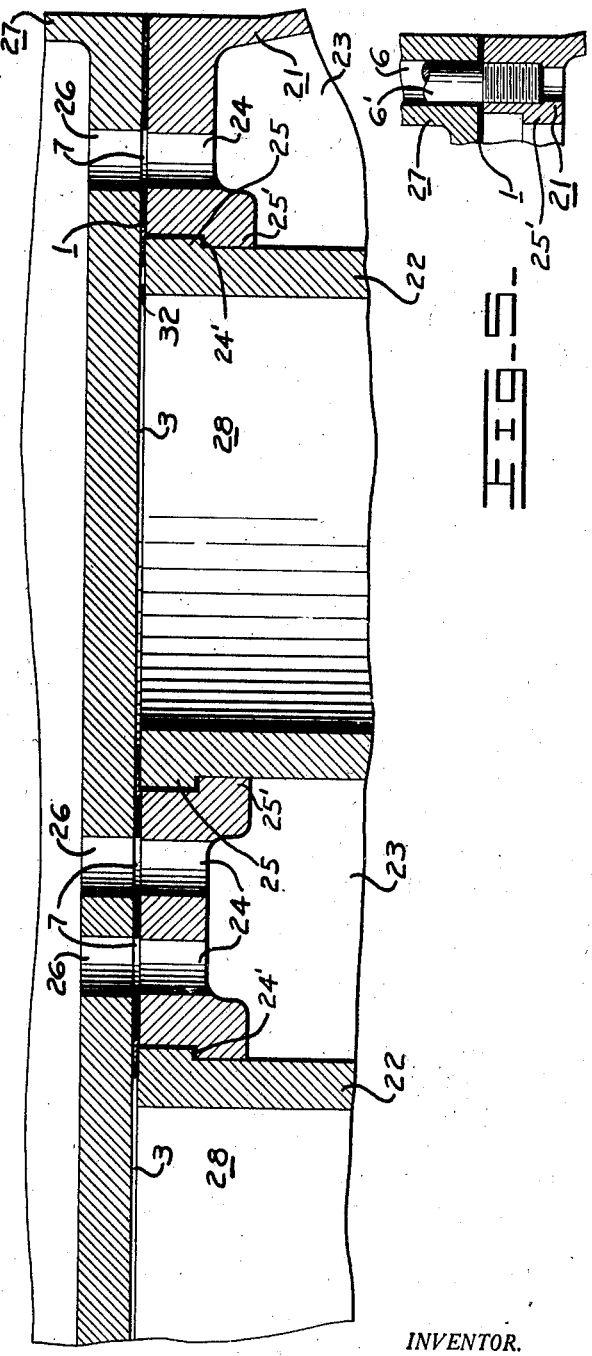
INVENTOR.
CARL G. A. ROSEN
BY
ATTORNEY.

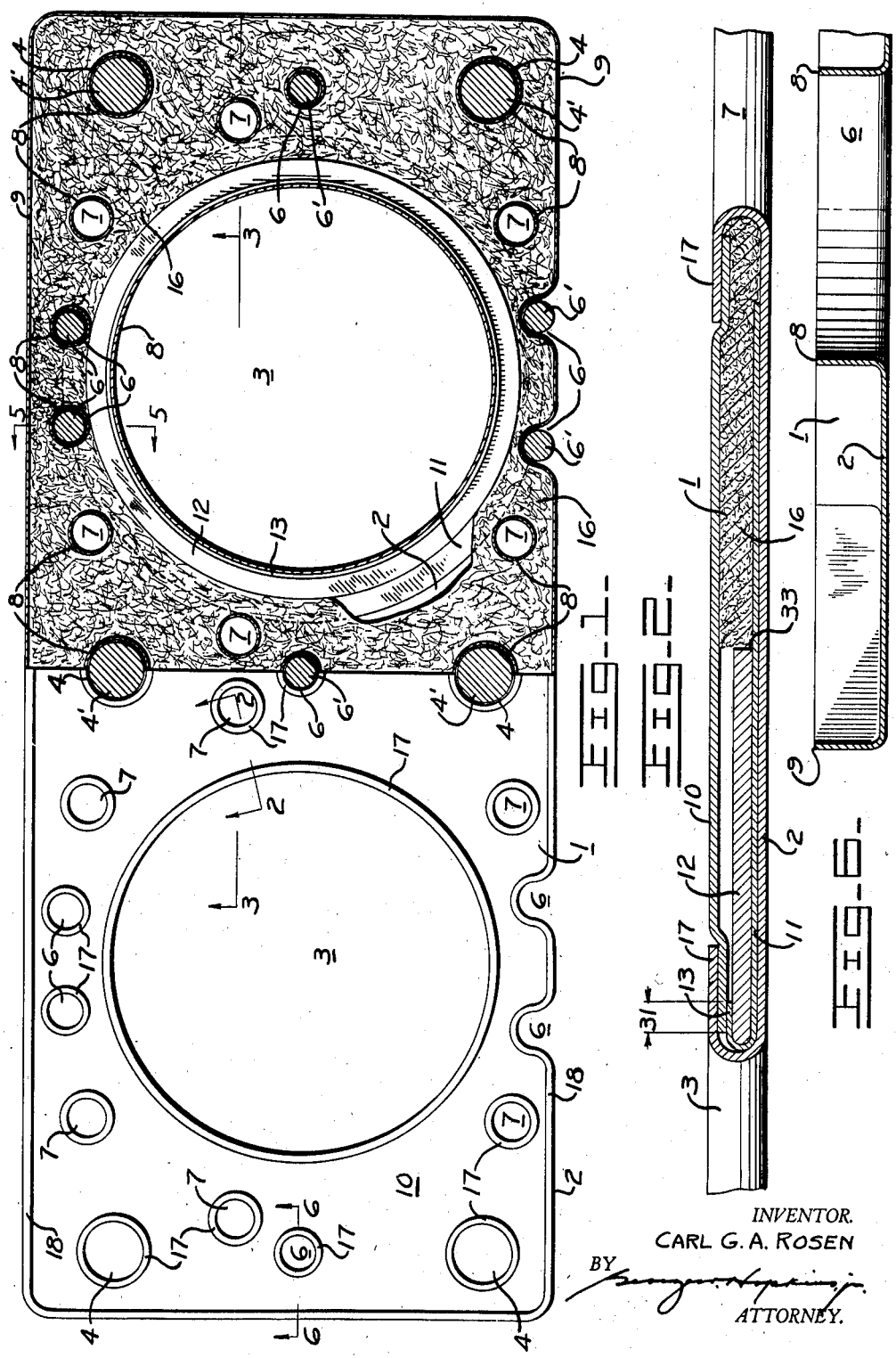

Patented Dec. 4, 1934

1,982,759

UNITED STATES PATENT OFFICE 1,982,759

GASKET

Carl G. A. Rosén, Oakland, Calif., assignor to Caterpillar Tractor Co., San Leandro, Calif., a corporation of California Application June 11, 1932, Serial No. 616,640

8 Claims. (Cl. 288—1)

My invention relates to gaskets, and particularly to cylinder head gaskets for internal combustion engines.

Introduction

In compression ignition engines and the like such as Diesel engines, the maximum pressures developed by the gases in the combustion chamber or cylinder are considerably greater than the pressures which an ordinary gas engine develops. Furthermore, the maximum temperatures of gases in the combustion chamber are greater in the former types of engines. Because of this, gaskets which will ordinarily serve efficaciously in gas engines cannot withstand the pressures and temperatures which obtain in engines that develop pressures and temperatures considerably higher than that developed in gas engines. Consequently, it has heretofore been general practice in Diesel engines and the like, in order to seal against the high pressures and temperatures of gases in the combustion chamber or cylinder, to resort to a tongue-and-groove sealing structure or other recess-type of solid gasket between the cylinder head and cylinder block. Usually, this has been done by forming integral with the cylinder head a circular flange, which is adapted to fit tightly in a complemental groove formed in the block structure and about the cylinder. Such construction necessitates the provision of separate gaskets, such as rubber rings, to prevent water leakage from the cooling water passages at the junction of the cylinder block and the cylinder head. Also, with such construction, a single cylinder head which is adapted to cover a plurality of cylinders, is not practical. This is so, because if there should happen to be any unevenness between the contacting surfaces of the cylinder head and the block structure, the tongue and groove or other recess-type gasket cannot be made to fit properly.

The gasket of my invention is designed to obviate the foregoing difficulties in compression ignition engines and the like constructions, such as Diesel engines; and it is also designed to permit the use of a single head construction capable of covering a plurality of cylinders.

Objects and general description of invention

It is, therefore, an object of my invention to provide a cylinder head gasket, particularly adapted to withstand high temperatures and/or pressures such as occur in Diesel engines.

Another object of my invention is the provision of a single gasket unit, which will efficaciously seal against the pressure created by gases in the cylinder or combustion chamber of an engine, as well as prevent leakage of cooling water circulating through the cylinder block and head of an engine.

Another object of my invention is the provision of a single gasket unit capable of serving a plurality of cylinders, especially in a compression ignition engine and the like such as a Diesel engine, thus allowing at least a double cylinder head construction.

Another object is the provision of a gasket, of the character described, which is of sufficient flexibility and compressibility, as to form a tight fit throughout between an engine block structure and a cylinder head, regardless of unevenness of surface on either one or both of these parts.

An additional object is to provide a gasket of economical but sturdy construction.

A further object is the provision of means, with a gasket of the character described, whereby the gasket can be secured in such manner between the cylinder head and block structure, as to provide a gasket section adjacent the cylinder which is under maximum sealing pressure.

Other objects of my invention will become apparent from a perusal of the following description thereof.

In general terms, the gasket of my invention comprises a substantially flat but flexible and compressible structure, which is capable of being tightly held under pressure between the cylinder head and block structure of an engine. Inasmuch as the gasket of my invention permits the use of a single head for a plurality of cylinders, it is provided with a plurality of cylinder apertures, i. e., apertures which are adapted to coincide with the openings formed by the cylinders. A heat-conducting and reenforcing structure is provided in the form of a substantially flat, laminated, metal ring about each cylinder aperture; this sealing structure being of such character as to withstand effectively the high pressures and temperatures developed in the combustion chamber or cylinder of the previously described type of engines, such as Diesel engines, in which my gasket finds great utility. The remainder of the gasket includes a heat-insulating filling or packing of suitable material, such as asbestos, which forms an effective seal about the water passages communicating with the cylinder head.

Apertures are formed peripherally about and closely adjacent each cylinder aperture, to provide means for allowing passage of securing means therethrough, which means are adapted to unite the cylinder head and the block structure, between which the gasket is tightly clamped. Since the apertures for the securing means are peripherally around and closely adjacent each cylinder aperture, the pressure on the gasket effected by the securing means holding the head down on the block structure, is concentrated in a comparatively narrow circular section about each cylinder and adjacent the edge thereof. Thus, an effective seal is provided.

Description of figures

Reference will now be made to the drawings for a more detailed description of a preferred form of the gasket of my invention, in which drawings:

Fig. 1 is on the left half a top plan view of the gasket; and on the right half is a horizontal sectional view through the same gasket illustrating its attachment in an engine. A part of the structure is omitted from the view to disclose clearly the construction.

Fig. 2 is a sectional view of the gasket, on the line 2—2 in Fig. 1.

Fig. 3 is a fragmentary longitudinal sectional view, through the head and the block structure of an engine, and through a portion of the cylinder head gasket held between the head and the block. The plane of the section is indicated by line 3—3 in Fig. 1.

Fig. 4 is an enlarged view, similar to that of Fig. 3; a portion of the structure through the cylinder, which is shown in full in Fig. 3, is broken away to shorten the view.

Fig. 5 is a fragmentary vertical sectional view through the engine structure. The plane of the section is indicated by line 5—5 in Fig. 1.

Fig. 6 is a fragmentary vertical sectional view through the bottom sheet of the gasket, illustrating its form prior to assembly with the other elements of the gasket. The plane of section is indicated by line 6—6 in Fig. 1.

Description of preferred form of gasket

As illustrated by Figs. 1 and 2, a preferred construction of the cylinder head gasket 1 comprises a bottom sheet 2 of flexible and smooth heat-conducting material, such as copper. Preferably, the copper sheet 2 is of No. 30 Brown & Sharpe gauge, which is ten one-thousandths (.010) of an inch in thickness. Sheet 2 is formed, in any suitable manner, to provide: a plurality of cylinder apertures 3; a plurality of apertures 4 through which tie rods 4¹ may pass for fastening together in a rigid structure the main bearings, block structure and cylinder head of the engine; a plurality of apertures 6 through which cylinder head studs 6¹ may pass for providing additional means securing the head to the block structure; and a plurality of apertures 7 through which cooling water may pass into the cylinder head and from the water jacket in the cylinder block structure. In the formation of bottom sheet 2, the peripheral edges at all the apertures and the edges of the sheet are bent upwardly, to provide upstanding-aperture flanges 8 and edge flanges 9, as shown in Fig. 6. Top sheet 10 of the gasket is preferably of the same material as the bottom sheet and also of the same gauge. It is provided with apertures complementing the apertures in bottom sheet 2, through which top sheet apertures upstanding-aperture flanges 8, on the bottom sheet 2, are adapted to extend when these parts are assembled.

Before positioning the top sheet over the bottom sheet, a reenforcing and laminated ring structure, preferably of metal, (the purpose of which will be subsequently explained) is placed on the bottom sheet and about each cylinder aperture 3 formed in the bottom sheet. Such structure comprises the relatively thin flexible sheet 11 of metal, preferably a copper sheet of No. 36 Brown & Sharpe gauge, which is five one-thousandths (.005) of an inch in thickness. Sheet 11 is interengaged adjacent cylinder aperture 3 with a comparatively heavy but flexible heat-conducting and reenforcing ring or sheet 12 of metal, preferably copper of No. 22 Brown & Sharpe gauge, which is two hundred fifty-three ten-thousandths (.0253) of an inch in thickness. As can be seen most clearly in Fig. 2, the interengagement between sheets 11 and 12 is effected by cleating or crimping sheet 11 over the inner edge of sheet 12, thus providing a flange 13 on the upper surface of sheet 12 and at the edge adjacent the cylinder aperture. Sheet 11 extends beyond the outer edge of sheet 12; and over this extending portion and the remainder of bottom sheet 2 is placed a resilient and heat-insulating packing or filling 16 of suitable material, preferably fibrous material such as an asbestos sheet. Packing 16 is formed with apertures complementing the apertures in the bottom sheet 2 and the top sheet 10.

After placing the reenforcing ring structure, just described, and the packing 16 on the bottom sheet 2, the gasket is formed by placing top sheet 10 in position and then cleating over the top sheet, the upstanding flanges 8 and 9 formed integral with the bottom sheet. The gasket, because of the construction just described, is flexible and compressible and it is held firmly together in a unitary structure, by virtue of the flanges 17 adjacent the apertures and flanges 18 at the edges of the gasket, which flanges are formed by crimping or cleating the upstanding flanges 8 and 9. Thus, the top and bottom sheets, when secured together, form a tight jacket or casing. In Fig. 2, a space is shown in the jacket between the top sheet and the ring 12. The space is for the purpose of more clearly illustrating the construction. When the parts are assembled and compressed, a solid, unitary and substantially flat structure obtains, as can be seen more clearly from Figs. 3 and 4.

Gasket and engine

In Figs. 3 through 5 is illustrated the previously described gasket, interposed between the block structure and head of an engine, such as a Diesel engine. The engine comprises block 21 and removably secured cylinder liners 22 mounted in the block, by means of peripheral flanges 25 at the upper edges of the liners, which flanges rest upon circular supporting flanges 25¹ integral with the block; suitable sealing rings 24¹, preferably of metal such as copper, being clamped between flanges 25 and 25¹. Water jackets 23 are provided in the block and about the cylinder liners. In the block are also formed water passages 24, communicating with the water jackets and with similar water passages 26 formed in the head 27. The gasket is tightly clamped between the block and the head, with the cylinder apertures 3 over the cylinders or combustion chambers 28, and with the water apertures 7 in communication with water passages 24, 26. The clamping is effected by means of the securing means 4¹ and 6¹, which pass through the apertures 4 and 6 and hold the head down tightly on the block structure. As can be seen most clearly in Fig. 4, should there be unevenness of the top surface formed by cylinder liners 22 and block 21, the gasket, because of its compressibility and flexibility, will readily yield under compression to form a tight fit between the block and head. Also, by the employment of the flat gasket, of the character described, care need not be taken to accurately align the tops of the liners with the block, and liners may be readily removed and replaced with new liners without having to machine evenly the surfaces of the block and liner. Thus, a head capable of serving a plurality of cylinders may be employed.

It is also to be noted from Figs. 3 and 4 that the relatively thick reenforcing and heat-conducting ring or sheet 12, which is preferably at least twice the thickness of the top and bottom sheets of the gasket, and substantially four times the thickness of thin sheet 11, is of a width sufficient to span the junction between the block 21 and the cylinder liner 22. Hence, weakening of the structure at this point is precluded.

As previously explained, the tie rods 4¹ and studs 6¹ provide securing means tightly clamping the gasket between the head and the block structure. Since the securing means are circumferentially spaced about and adjacent each cylinder aperture 3, substantially all the pressure exerted on the gasket is concentrated in a narrow and circular ring section 31 closely adjacent the edge of cylinder aperture 3. The ring section will be located in the least compressible portion of the gasket, and will be formed by the part of such portion which is of maximum thickness when the gasket is compressed between the head and the block structure. Since the laminated metallic portion of the gasket is the least compressible, section 31 will extend therethrough; and since the thickest solid part of such portion is determined by the amount of overlap of the lamination formed by top sheet 10 on cleat or flange 13, the width of section 31 will be fixed substantially by the degree of overlap. Hence, the laminated metal section also acts to enhance concentration of pressure. Because of the concentration of pressure on the narrow section 31 closely adjacent the edge of the cylinder aperture 3, a most efficacious seal is provided against the high pressures developed in the combustion chamber or cylinder 28. This is so, inasmuch as concentration of a given clamping pressure on a small area of a gasket increases the unit pressure per square inch of gasket area. The section 31, since it is entirely of metal all the way through the gasket by virtue of the construction which the metallic sheets and flanges 13, 17 of the gasket provide, is capable of withstanding the concentrated pressure. Also, since the fibrous packing 16 is more resilient and compressible than the metal section of the gasket adjacent cylinder aperture 3, it will readily yield under the pressure exerted at 31 and thus provide a tight fit at the remaining portions of the gasket.

The high gas pressures, developed in combustion chamber 28, are directed against the exposed sealing edge of the gasket formed by cylinder aperture 3, as indicated by arrow 32. However, the gasket is capable of withstanding this pressure because of the reenforcement which obtains by virtue of the comparatively heavy metal ring or sheet 12. Also, because of the comparatively large metal mass which member 12 presents, it is capable of rapidly conducting away the heat in the combustion chamber to the cooler portions of the gasket. It is for the latter reason that reenforcing ring 12 is preferably of copper to provide a high rate of heat transmission.

Since the portion of the gasket surrounding the water passages is filled with fibrous material, an effective water seal obtains; and as previously set forth, the fibrous material is sufficiently resilient to give away under the pressure exerted by the cylinder head securing means, thus enhancing a tight seal adjacent the water passages. Furthermore, the provision of flanges 17 adjacent the water-passage apertures 7, doubles up the metal section at the top of the gasket, to impart added compressibility to the asbestos and thereby further enhance the water seal. Reenforcing sheet 11 which extends beyond heat-conducting and reenforcing ring or sheet 12, forms a support for the asbestos sheet 16 at the point of contact 33 between it and the sheet 12. This provides means to prevent the gasket from rupturing at point 33, by lending assistance in preserving the continuity of the lower surface of the gasket on the cylinder block portion of the engine.

Although I have described my gasket as being particularly applicable to engines in which extremely high pressures and temperatures of gases are developed, such as obtain in Diesel engines, it is apparent that a gasket utilizing the principles of my invention may be employed in other engines to provide an effective seal. Also, although I have given the actual dimensions of a preferred form of construction, it is apparent that such dimensions may be varied within wide limits, depending upon the size of gasket desired, the pressures which the gasket is intended to withstand and the temperatures under which the gasket is intended to function.

I, therefore, claim as my invention:

1. A gasket having an aperture and comprising spaced sheets of material forming a jacket, a laminated reenforcing structure in said jacket and about said aperture, said reenforcing structure comprising sheets of metal one of which extends beyond another, and fibrous material in said jacket and on the extending portion of said one sheet.

2. A gasket having an aperture and comprising spaced sheets of metal, a laminated reenforcing structure between said sheets and about said aperture, said reenforcing structure comprising sheets of metal one of which extends beyond and is thinner than another, and a sheet of packing resting on the extending portion of said one sheet.

3. A gasket having an aperture and comprising spaced sheets of copper; a laminated reenforcing structure between said sheets and about said aperture; said reenforcing structure comprising sheets of copper one of which is at least twice as thick as the spaced sheets, and another of which is less than one-half the thickness of the first-mentioned sheet in said reenforcing structure and extends beyond said first-mentioned sheet; and a packing sheet on said extending portion.

4. A gasket having an aperture and comprising spaced sheets of metal; a laminated reenforcing structure between said sheets and about said aperture; said reenforcing structure comprising sheets of metal one of which is at least twice as thick as the spaced sheets, and another of which is less than one-half the thickness of the first-mentioned sheet in said reenforcing structure and extends beyond said first-mentioned sheet; the reenforcing structure sheets being interengaged at the edge defining said aperture; and packing material on said extending portion.

5. A cylinder head gasket comprising a jacket having a cylinder aperture, said jacket being formed by spaced sheets of metal overlapped adjacent said cylinder aperture, a metallic reenforcing structure about said cylinder aperture and interposed between said jacket sheets, said structure comprising sheets of material, a sheet of which structure extends beyond the remaining of said sheets, and a compressible resilient packing interposed between said jacket sheets and contacting said structure, said packing being supported on the extending portion of said structure sheet.

6. A cylinder head gasket comprising a jacket having a cylinder aperture, said jacket being formed by spaced sheets of metal overlapped adjacent said aperture, a laminated metallic reenforcing structure about said cylinder aperture and interposed between said jacket sheets to provide a solid metal body directly adjacent said aperture when the gasket is compressed, said structure comprising a relatively thin metal sheet and a separate relatively thick metal sheet contacting said relatively thin sheet, an end part of said thin sheet adjacent said aperture overlapping the edge of said thick sheet adjacent said aperture, and a portion of said end part resting on a surface of the thick sheet adjacent said edge thereof to provide a section of maximum thickness for concentration of pressure.

7. A cylinder head gasket comprising a jacket having a cylinder aperture, said jacket being formed by spaced sheets of metal overlapped adjacent said aperture, a laminated metallic reenforcing structure about said cylinder aperture and interposed between said jacket sheets to provide a solid metal body directly adjacent said aperture when the gasket is compressed, said structure comprising a relatively thin metal sheet and a separate relatively thick metal sheet contacting said relatively thin sheet, an end part of said thin sheet adjacent said aperture overlapping the edge of said thick sheet adjacent said aperture, a portion of said end part resting on a surface of the thick sheet adjacent said edge thereof to provide a section of maximum thickness for concentration of pressure, said thin sheet extending beyond the edge of said thick sheet remote from said aperture, and a compressible resilient packing interposed between said jacket sheets and contacting said structure, said packing being supported on the extending portion of said thin sheet.

8. A cylinder head gasket comprising a jacket having a cylinder aperture, said jacket being formed by spaced sheets of metal overlapped adjacent said cylinder aperture, a laminated metallic reenforcing structure about said cylinder aperture and interposed between said jacket sheets to provide a solid metal body directly adjacent said aperture when the gasket is compressed, one of the laminations of said structure being narrower than the remaining laminations of said structure to provide a section of maximum thickness for concentration of pressure, another of said laminations extending beyond the remaining of said laminations, and a compressible resilient packing interposed between said jacket sheets and contacting said structure, said packing being supported on the extending portion of said another lamination.

CARL G. A. ROSÉN.